3,245,622
STEAM-WATER SPRAY NOZZLE
Robert E. McBride, Port Arthur, Tex., assignor to Texaco Inc., New York, N.Y., a corporation of Delaware
Filed Dec. 13, 1963, Ser. No. 330,285
8 Claims. (Cl. 239—425)

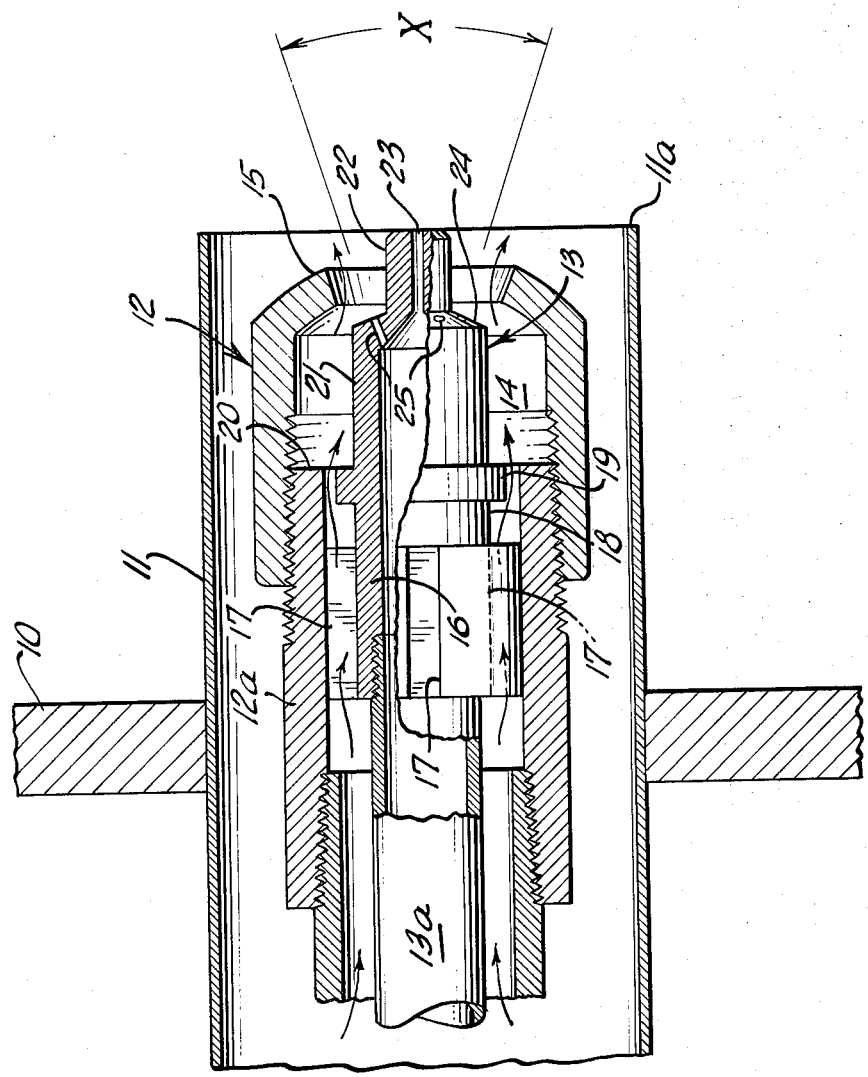

This invention relates generally to fluid catalytic cracking units, and specifically to a spray nozzle structure for catalyst regenerators of such units.

During the operation of fluid catalytic cracking units, the catalyst is regenerated by burning off carbon therefrom, after the catalyst has been drawn off from the catalytic reactor into the catalyst regenerator. Since the circulation of the catalyst through a regenerator may range from 25 to 40 tons per minute, considerable amounts of combustible gases are included in the products of combustion in the regenerator, with temperatures reaching the elevated range of 1100° F., more or less. Consequently, the chance of after-burning of combustible gases, e.g., CO, above the fluidized bed of the catalyst in the regenerator is very great. To reduce the possibility of and/or quench such after-burning, the combustion gases above the catalyst bed in the regenerator are cooled with steam and/or water.

It is an object of this invention to provide an improved spray nozzle structure for use in the catalyst regenerator of a fluid catalytic cracking unit.

Another object of the invention is to provide an improved spray tip assembly which is economical to manufacture and has a long life during its use in the catalyst regenerator.

These and other objects of the invention will be apparent by reference to the drawing showing the steam-water spray nozzle in position extending through the housing in the wall of a catalyst regenerator.

The objects of the invention are attained by providing an external annular blanket of steam for atomizing water sprayed from an internal arrangement of passages.

Referring to the drawing, a catalyst regenerator wall portion is disclosed at 10, through which extends a pipe-like housing 11. The spray tip assembly or nozzle includes the steam tip 12 fastened, as by screw threading, to the outer conduit 12a, which provides steam, and the water tip 13 fastened as by screw threading, to the inner conduit 13a, which provides the water, the tips at the ends of the conduits being spaced from each other to provide an exit chamber 14 with an annular opening at the exit thereof, between the water tip and the inwardly flared exit edge of the steam tip, indicated at 15, shaped to direct steam inwardly towards the longitudinal axis of the spray tip assembly. The water tip 13, at the end of the inner conduit comprises a base 16 which fits snugly against the internal wall of the external or steam providing conduit. This base has a plurality of longitudinal slots or channels 17, usually four, spaced about its circumference, so that the segments of the base separated by the channels serve as spacing members for the inner conduit within the outer conduit. The channels lead to an undercut cylindrical portion at 18 which serves as a distributing chamber for the steam as it passes around the steam distributing collar at 19, into the exit chamber 14, from whence it issues from the annular exit opening as a uniform cylindrical annulus of steam. The exit chamber 14 is defined at its base by the collar 19 and the coplanar edge 20, of the outer conduit 12a, by the steam tip 12 and the cylindrical body 21, of the water tip, extending downstream from the steam distributing collar and of lesser diameter thereof, and having a smaller, cylindrical coaxial plug 22 projecting from the downstream face of the cylindrical body.

This cylindrical plug 22 has a coaxial hole or passage therethrough, indicated at 23, and the downstream face or shoulder 24, at the end of the cylindrical body has a plurality of outwardly angularly disposed passages 25, disposed circumferentially around the projecting plug 22. These passages 25 are at a minor acute angle with respect to the longitudinal axis of the water tip, and are drilled or shaped so that the water flowing therethrough does not strike the inwardly flared edge at 15, and provides a spray having a cone angle of 36°, indicated as X. With water being provided through both coaxial and angularly disposed passages, and steam provided by the outer conduit in annular fashion being directed inwardly, there is an atomizing action upon impact by the steam which disperses the water into fine droplets and provides for cooling of the combustion gases above the fluidized catalyst bed in a regenerator. In this manner, the provision of a coaxial center passage does away with the low pressure area which formerly existed when the prior art spray tip assembly, having only a circle of passages, was used, resulting in erosion of the water tip in a very short time and providing a water spray angle less than half that desired, viz. approximately 15-18°. When a spray nozzle of the type disclosed herein was used, the life of the water tip was extended over 30 times, and by the use of certain tungsten alloys in the manufacture of the water tip, the life was extended over 100 fold.

As disclosed in the drawing, the cylindrical plug 22 projects slightly beyond the discharge edge of the steam tip, about ⅛", and is positioned to be flush with the inner edge 11a of the housing 11.

In the operation of this steam-water spray, steam is introduced continuously through each nozzle installation at the rate of 100 pounds per hour, to prevent plugging of the several passages by the catalyst and to keep the tip cool. Water and its dispersing steam are cut in and out as required. Both the water and the steam used to disperse the water, are at 50 p.s.i.g. pressure, and the atomizing steam used will be about 10% to 20% by weight basis the water, when water and steam are at the indicated pressures. While the spray volume and the amount of dispersion of the water droplets vary considerably with variation in rates and water:steam ratios, there is little variation from a 36° angle of the spray cone, throughout the range of variables investigated.

Thus, there has been shown and described an improved spray structure for providing water and atomizing steam for purposes of cooling combustion gases in a catalyst regenerator which not only extends the life of the spray structure but also provides water for cooling with extensive cooling surfaces in the shape of atomized droplets.

Obviously, other modifications and variations of the invention as hereinbefore set forth may be made without departing from the spirit and scope thereof, and therefore only such limitations should be imposed as are indicated in the appended claims.

I claim:

1. A gas-liquid spray structure comprising an outer conduit and an inner conduit spaced therewithin and each ending in spaced relationship to each other to define an annular opening, said inner conduit ending in a tip having means thereon for positioning said inner conduit concentrically within said outer conduit, a collar of lesser diametral dimension than said means spaced downstream therefrom, a cylindrical body portion extending further downstream from said collar and ending in a downstream facing surface having a plurality of openings therein directed in a downstream direction outwardly and coaxially with respect to said cylindrical body portion, the axis of each outwardly directed opening defining an acute angle with respect to the axis of the coaxially directed opening so as to provide free flow from said inner conduit without obstruction by said outer conduit.

2. A structure for mixing a gas and a liquid which comprises a substantially cylindrical hollow inner body member terminating in a tip having outlets for the passage of a liquid therethrough, a substantially cylindrical hollow outer body member of larger diameter than said inner body member and disposed about said inner body member to define an annular passageway therebetween and terminating in a discharge end substantially surrounding said tip for the passage of a gas therethrough, means adjacent said discharge end for spacing said members from each other, said outer body member having its discharge end flared inwardly and defining an annular discharge orifice with said tip of said inner body member, certain of said outlets in said tip being angled outwardly in a downstream direction each with a flow axis to avoid contact with said discharge end of said outer body member and being spaced circumferentially and coaxially with said inner body member, said tip also having a coaxial outlet, and a distributing collar for said gas position downstream of said means for spacing said body members and located adjacent said discharge end to provide annular gas flow.

3. A spray nozzle comprising an inner conduit ending in a tip having openings therein for the passage of a liquid, and an outer conduit spaced in annular relationship to said inner conduit and ending in a inwardly flared discharge edge adjacent said tip of said inner conduit to define an annular passageway therebetween for the passage of a gas, said tip having spacing means for locating said inner conduit concentrically within said outer conduit and a flow distribution collar spaced downstream said spacing means, said openings of the inner conduit tip being angled outwardly and axially, whereby concurrent flow of gas and liquid provides intermixing of said gas and said liquid to produce spray, the flow axis of each outwardly angled opening being such as to provide for flow of liquid free from obstruction by said outer conduit.

4. A spray nozzle as defined in claim 3, in combination with a pipe-like housing in a catalyst regenerator wall, said outer conduit being closely positioned within said housing, the end of said tip being coplanar with the end of said housing and extending slightly beyond said discharge edge of said outer conduit.

5. A nozzle for atomizing water comprising, in combination with a catalyst regenerator wall having a pipe-like hausing extending therethrough for receiving said nozzle, an outer member for providing a flow of steam and an inner member positioned concentrically within said outer member for providing a flow of water, both members ending closely adjacent each other to define an annular opening, said inner member having a tip at its discharge end with spacing means and flow distribution structure upstream and adjacent thereto, said tip having passages in its downstream face for water flow therethrough, said flow distribution structure includig a steam distribution collar on said tip located downstream said spacing means, said tip having a coaxial cylindrical plug extending in a downstream direction and having an axial passage therethrough, and a plurality of passages spaced circumferentially around said plug, each with a flow axis to provide flow of water from said nozzle free from obstruction by said outer member.

6. In the nozzle as defined in claim 5, the circumferentially spaced passages being directed angularly outward downstream to provide a water spray having a cone angle of 36°.

7. A spray nozzle structure comprising an outer cylindrical conduit member ending in an inwardly flared discharge edge for providing a gas, an inner cylindrical conduit member for providing a liquid located within said outer conduit member and ending in a tip adjacent said discharge edge to define an annular discharge opening therebetween for passage of said gas, said tip comprising spacing members having close contact with the inner surface of said outer conduit and a distributing collar downstream said spacing members and of lesser diametral dimension to define an annular chamber open in downstream direction therebetween, and a coaxial cylindrical body extending downstream said distributing collar and of lesser diametral dimension thereof to define an exit chamber with the end of said outer member, said body member having a cylindrical plug extending from the downstream face thereof and having outwardly dirceted passages spaced circumferentially around said plug, said plug being coaxial with said cylindrical body and having a coaxial passage therethrough and projecting outwardly slightly beyond said discharge edge, the angle of said outwardly directed passages being such to prevent impingement of liquid passing therethrough upon said discharge edge.

8. A spray nozzle as defined in claim 7, in combination with a pipe-like housing in a catalyst regenerator wall, said outer conduit member being positioned with small clearance in said housing and providing steam, said inner conduit member providing water whereby flow contact between said steam and water at said discharge opening provides spray, the downstream face of said plug being coplanar with the end of said housing.

References Cited by the Examiner

UNITED STATES PATENTS

| 391,865 | 10/1888 | Schutte | 239—428 |
|---|---|---|---|
| 1,194,827 | 8/1916 | Edgerton | 239—422 |
| 2,395,614 | 2/1946 | Csepely | 158—76 |
| 2,737,419 | 3/1956 | Marcuse | 239—428 |
| 2,965,303 | 12/1960 | Jackson | 239—422 |
| 3,013,732 | 12/1961 | Webster et al. | 239—424 |

FOREIGN PATENTS

| 742,087 | 12/1955 | Great Britain. |
|---|---|---|

M. HENSON WOOD, JR., *Primary Examiner.*
EVERETT W. KIRBY, *Examiner.*